United States Patent
Umesaka

(10) Patent No.: US 9,925,977 B2
(45) Date of Patent: Mar. 27, 2018

(54) ELECTRONIC CONTROL UNIT

(71) Applicant: DENSO CORPORATION, Kariya, Aichi-pref. (JP)

(72) Inventor: Takeo Umesaka, Kariya (JP)

(73) Assignee: DENSO CORPORATION, Kariya (JP)

(*) Notice: Subject to any disclaimer, the term of this patent is extended or adjusted under 35 U.S.C. 154(b) by 63 days.

(21) Appl. No.: 14/887,791

(22) Filed: Oct. 20, 2015

(65) Prior Publication Data
US 2016/0185342 A1 Jun. 30, 2016

(30) Foreign Application Priority Data
Dec. 25, 2014 (JP) ................................. 2014-263122

(51) Int. Cl.
B60W 20/50 (2016.01)
B60W 10/06 (2006.01)
B60W 10/08 (2006.01)
B60W 50/02 (2012.01)

(52) U.S. Cl.
CPC ....... *B60W 20/50* (2013.01); *B60W 2050/021* (2013.01); *Y10S 903/93* (2013.01)

(58) Field of Classification Search
CPC ...... B60W 20/50; B60W 10/06; B60W 10/08; B60W 2710/06; B60W 2400/00; B60W 2050/021; Y02T 10/6286; Y10S 903/93
USPC .................. 701/22; 180/65.265; 903/930
See application file for complete search history.

(56) References Cited

U.S. PATENT DOCUMENTS

| | | | |
|---|---|---|---|
| 6,131,538 A | 10/2000 | Kanai | |
| 2013/0035815 A1* | 2/2013 | Ando | B60W 10/08 701/22 |
| 2013/0096757 A1* | 4/2013 | Fukui | F02M 25/0809 701/22 |

FOREIGN PATENT DOCUMENTS

JP  2011-111977 A  6/2011

* cited by examiner

*Primary Examiner* — Nga X Nguyen
(74) *Attorney, Agent, or Firm* — Posz Law Group, PLC

(57) ABSTRACT

An electronic control unit controls a vehicle, which includes an internal combustion engine and a motor as a vehicle driving power source. The electronic control unit includes a count part, a diagnosis part and a control part. The count part counts a stop period, for which the internal combustion engine is stopped. The diagnosis part diagnoses a diagnosis object included in the internal combustion engine. The control part controls driving of the internal combustion engine. The control part drives the diagnosis object forcibly and commands the diagnosis part to diagnose the diagnosis object, when the stop period reaches a predetermined threshold value.

11 Claims, 5 Drawing Sheets

ELECTRONIC CONTROL UNIT

CROSS REFERENCE TO RELATED APPLICATION

This application is based on Japanese patent application No. 2014-263122 filed on Dec. 25, 2014, the disclosure of which is incorporated herein by reference.

FIELD

The present disclosure relates to an electronic control unit for controlling a hybrid vehicle.

BACKGROUND

In a hybrid vehicle (HV), which is provided with an internal combustion engine and a motor as a driving power source, a power storing capacity of a battery mounted in the vehicle is increased and power consumption of electronic devices mounted in the vehicle are decreased. With those improvements, a travel distance of the vehicle attained only by way of the motor (EV travel) is increased.

As a result, it often arises that the internal combustion engine is not operated at all in a short travel of the vehicle, for instance, in a city driving. When the internal combustion engine is not operated at all for a long period, actuators of the internal combustion engine tend to become inoperative because of fixture of structural parts in the actuator.

To counter the problem of fixture in the actuator, patent document JP 2011-111977 A proposes that a generator-side ECU measures a period of non-operation of the internal combustion engine from the last operation stop to the next operation start and counts the number of times the measured non-operation period reaches a predetermined period. When a counted number of the non-operation period reaches a predetermined count, maintenance of the engine is advised.

This proposal only notifies of prediction of possible failure and fails to perform a diagnosis of the internal combustion engine with high accuracy. It also fails to maintain diagnosis frequently.

SUMMARY

It is therefore an object to provide an electronic control unit, which ensures frequent diagnosis.

According to one aspect, an electronic control unit is provided for controlling driving of a vehicle, which has an internal combustion engine and a motor as a vehicle driving power source. The electronic control unit comprises a count part, a diagnosis part and a control part. The count part counts a stop period, for which the internal combustion engine is stopped. The diagnosis part diagnoses a diagnosis object included in the internal combustion engine. The control part controls an operation of the internal combustion engine. The control part drives the diagnosis object forcibly and commands the diagnosis part to diagnose the diagnosis object, when the stop period reaches a predetermined threshold value.

EMBODIMENT

Figure 1:
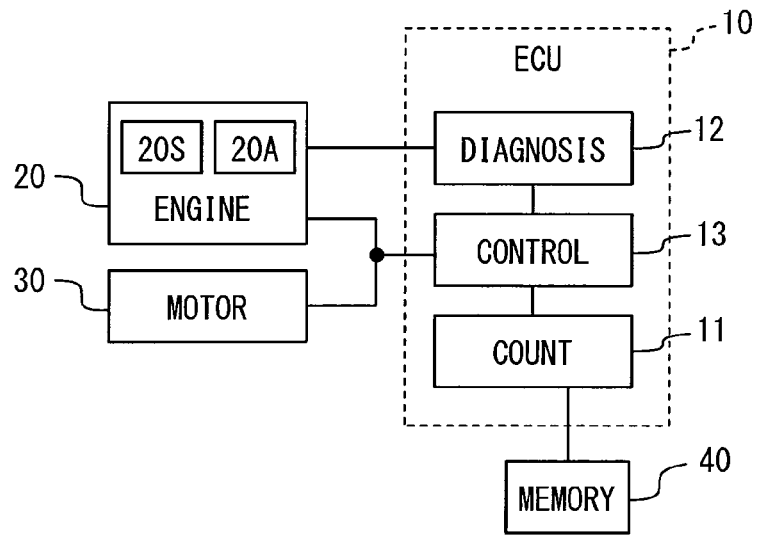
FIG. 1 is a block diagram showing an electronic control unit and its peripheral devices according to a first embodiment.

An electronic control unit will be described below with reference to various embodiments and modifications shown in the drawings. Same or equivalent structural or functional parts are designated with same reference numerals among the drawings.

First Embodiment

A general configuration of an electronic control unit according to the present embodiment will be described first with reference to FIG. 1. This electronic control unit is an apparatus, which controls driving of a hybrid vehicle (HV) having an internal combustion engine and a motor as a driving power source for the vehicle.

As shown in FIG. 1, an electronic control unit (ECU) 10 according to a first embodiment includes a count part 11, a diagnosis part 12 and a control part 13, which may be hard-wired electronic circuits or a microcomputer programmed to perform functions of the respective parts 11, 12 and 13. The electronic control unit 10 is configured to control an internal combustion engine 20 and a motor 30 for vehicle travel. The motor 30 is a motor/generator, which operates as a generator to generate electric power when driven upon deceleration of a vehicle.

The count part 11 is connected to the control part 13, which will be described later. The count part 11 receives an engine stop command generated by the control part 13 for the internal combustion engine 20 and counts a stop period, which is an integration of a period of continuation of non-operation of the internal combustion engine 20. The stop period is counted from when power supply from a battery +B to the electronic control unit 10, specifically to the control part 13, is turned on to when it is turned off in a period of non-operation of the internal combustion engine 20, which is from when the internal combustion engine 20 was stopped last time to when the internal combustion engine 20 is started again after the last stop.

As shown in FIG. 1, the count part 11 is also connected to a memory 40 and stores information of the counted stop period. The memory 40 is a non-volatile memory such as a flash memory, for example, which is capable of holding the information of the stop period even when the power supply to the electronic control unit 10 is turned off. That is, the count part 11 is configured to perform counting by integrating the stop period over plural driving cycles, each of which is from when the power supply to the control part 13 is turned on to when it is turned off.

The diagnosis part 12 is configured to perform diagnosis for checking whether a predetermined device, which is a diagnosis object, operates normally. The diagnosis part 12 is connected to at least the internal combustion engine 20.

More specifically, the diagnosis part 12 is connected to actuators 20A and sensors 20B, which are diagnosis objects to be diagnosed, among devices forming the internal combustion engine 20. The diagnosis part 12 is configured to diagnose the actuators 20A and the sensors 20S according to a process, which is predetermined for each diagnosis object. For example, the actuators 20A include a fuel injection device including an electromagnetically-operated valve and the sensors 20S include an airflow sensor.

The control part 13 is connected to be capable of communication with the internal combustion engine 20 and the motor 30. The control part 13 is configured to control the actuators 20A provided to the internal combustion engine 20 and the moor 30 for vehicle travel. In addition, the control part 13 is connected to be capable of communication with the count part 11 and the diagnosis part 12.

The control part 13 is configured to cause the diagnosis part 12 to diagnose each diagnosis object based on the information of the stop period of the internal combustion engine 20 received from the count part 11. The diagnosis part 12 is configured to request the control part 13 to forcibly operate the actuator 20A as the diagnosis object even in a case that the internal combustion engine 20 is not in operation, when the counted stop period satisfies a predetermined condition. The control part 13 is configured to drive the actuator 20A or the sensor 20B related to the diagnosis object of the internal combustion engine 20. The diagnosis part 12 is configured to perform the diagnosis in accordance with the process predetermined for the diagnosis.

Figure 2:
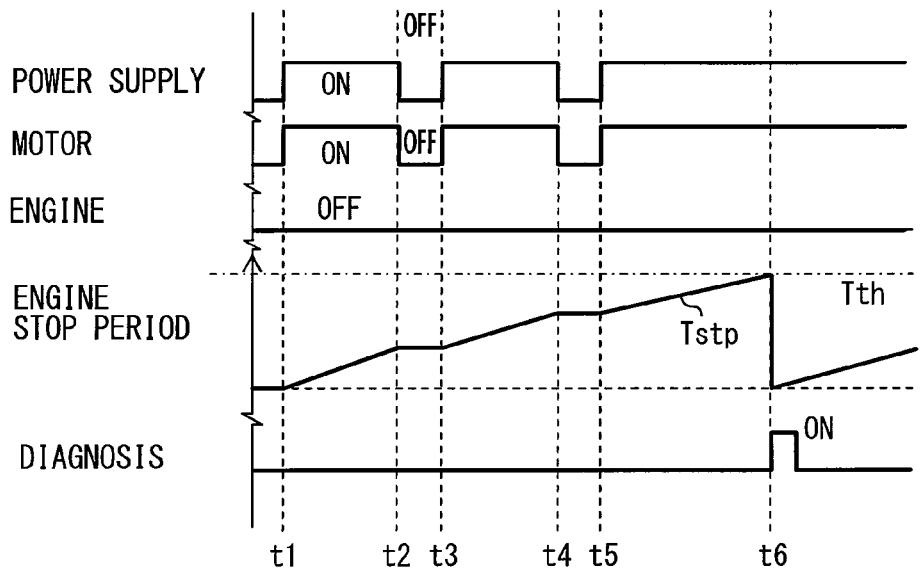
FIG. 2 is a timing chart showing a control operation of the electronic control unit according to the first embodiment.
Figure 3:
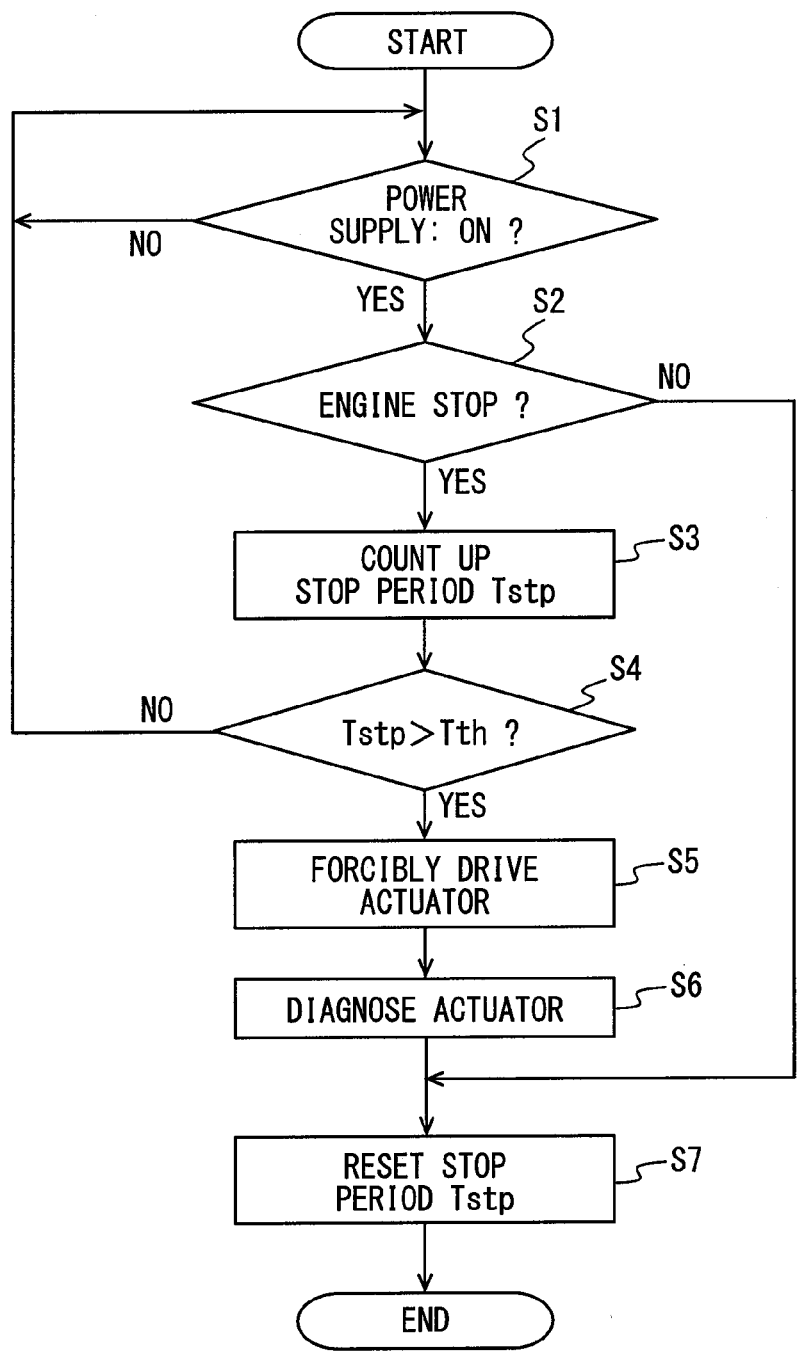
FIG. 3 is a flowchart showing an operation of the electronic control unit according to the first embodiment.

The electronic control unit 10 is configured to perform the processing shown in FIG. 2 and FIG. 3.

FIG. 2 is a timing chart showing operations of the control part 13, the internal combustion engine 20 and the motor 30 as well as changes of the stop period until the diagnosis is performed. FIG. 3 is a flowchart showing the diagnosis operation of the electronic control unit 10.

The operation of the electronic control unit 10 will be described next assuming that, as shown in FIG. 2, the vehicle is driven to travel with only the motor 30 being operated and with the internal combustion engine 20 being not operated (OFF). That is, the following situation is assumed.

A driver turns on an ignition switch IG-SW of the vehicle at time t1 and the power supply to the control part 13 is turned on (ON). The driver then drives the vehicle (EV travel) by operating the motor 30 (motor ON) but without operating the internal combustion engine 20 (engine OFF) until time t2 and stops driving the vehicle at time t2, thus finishing one driving cycle of the vehicle. The driver turns on the ignition switch IG-SW of the vehicle again at time t3 and the power supply to the control part 13 is turned on again. The driver then drives again the vehicle (EV travel) without operating the internal combustion engine 20 until time t4 and stops driving the vehicle at time t4, thus finishing another driving cycle. The driver turns on the ignition switch of the vehicle again at time t5 and the power supply to the control part 13 is turned on again for EV travel for a further driving cycle.

The operation of the electronic control unit 10 will be described in detail with reference to FIG. 3.

First step S1 is executed. At step S1, the control part 13 checks whether the power supply to itself is turned on. When the power supply to the control part 13 is turned on, it is determined YES and step S2 is executed. When the power supply to the control part 13 is not turned on or most of functions of the control part 13 are in sleep states, step S1 is repeated without executing step S2.

At step S2, it is checked by the control part 13 whether the internal combustion engine 20 is being stopped and in non-operation (OFF). When the internal combustion engine 20 is in operation, the actuators 20A operate. In this case, it is possible to perform the diagnosis related to the internal combustion engine 20 normally. It is therefore determined to be NO and step S7 is executed. That is, the actuators 20A are not forcibly driven and the count of the stop period is reset. When the internal combustion engine 20 is stopped and in non-operation, it is determined to be YES and step S3 is executed. That is, step S3 is executed on condition that the internal combustion engine 20 is stopped (OFF) and the power supply to the control part 13 is turned on (ON).

At step S3, the count part 11 counts up the stop period Tstp. It is already confirmed at step S1 that the power supply to the control part 13 is turned on. It is also already confirmed at step S2 that the internal combustion engine 20 is stopped. That is, at execution of step S3, the vehicle is in a condition that the internal combustion engine 20 is not in operation and the control part 13 is performing some operations for vehicle travel. The vehicle is in a state that the motor 30 is driven by the control part 13 during a period between time t1 and time t2, a period between time t3 and time t4 and a period after time t5 shown in FIG. 2. The count part 11 continues to count up the stop period Tstp in the period between the time t1 and time t2, the period between time t3 and time t4 and the period after time t5.

The period between time t1 and time t2 or the period between t3 and t4 is a period, which starts from turning on and ends at turning off of the power supply to the control part 13. This period corresponds to one driving cycle.

In the period before time t1, the period between time t2 and time t3 and the period between time t4 and time t5 in FIG. 2, it is determined to be NO at step S1 because of no power supply and the stop period Tstp is not counted up.

As shown in FIG. 2, since the memory 40 is connected to the count part 11, the information of the stop period Tstp may be held in the memory 40 even when the power supply to the electronic control unit 10, and hence the control part 13, is turned off. The stop period Tstp is counted up from time t1 to time t2 and the information of the counted stop period is held in the memory 40 even when the power supply to the control part 13 is turned off at time t2. When the power supply to the control part 13 is turned on at time t3, the count part 11 starts counting up the stop period Tstp from the preceding count stored in the memory 40 again. That is, the count part 11 counts up the stop period Tstp over plural driving cycles of the vehicle.

Then step S4 is executed. At step S4, the control part 13 compares the stop value Tstp, which is an integrated value of time, in which the internal combustion engine 20 is not operated during vehicle travel, with a predetermined threshold value Tth. When the stop period Tstp is equal to or smaller than the threshold value Tth, it is determined to be NO at step S4 and step S1 is executed. When the stop period Tstp is larger than the threshold value Tth, it is determined to be YES at step S4 and step S5 is executed. As shown in FIG. 2, the stop period Tstp is equal to or smaller than the threshold value Tth before time t6, it is determined to be NO at step S4. However, at time t6, it is determined to be YES since the stop period Tstp reaches the threshold value Tth.

The threshold value Tth is set to be shorter than a period, which will cause fixture of movable parts in the actuator 20A of the internal combustion engine 20 because of rusting when it not activated. The threshold value Tth is preferably set to be a short period having a sufficient margin relative to a period, which will disable the actuator 20A to operate normally. However, when the threshold value Tth is set to be too short, the actuator 20A will be caused to be driven unnecessarily. This results in poor fuel consumption and driveabiltiy or shorter life of the actuator. For this reason, the threshold value Tth need be set to an appropriate value in correspondence to specifications of a vehicle.

At step S5, the control part 13 drives the actuator 20A, which is the diagnosis object of the internal combustion engine 20, or the actuator 20A, which causes the sensor to detect a physical quantity. When step S5 is executed, the internal combustion engine 20 is in stopped state (OFF) as determined at step S2. The actuator 20A is driven forcibly at time t6 at S5 when the stop period Tstp reaches the threshold value Tth. The actuator 20A is driven under the same condition as that of the normal travel of the internal combustion engine 20 or under a required specification predetermined exclusively for diagnosis.

Then step S6 is executed. At step S6, the control part 13 commands the diagnosis part 12 to diagnose the actuator 20A and the sensor 20S, which are diagnosis objects, and the diagnosis part 12 performs the commanded diagnosis (ON). The diagnosis part 12 diagnoses the diagnosis object in accordance with the required specification.

Then step S7 is executed. At step S7, the stop period Tstp integrated by the count part 11 is reset to 0. The stop period Tstp is reset when the internal combustion engine 20 is started. Step S7 is executed after step S6 or when step S1 determines to be NO. As shown in FIG. 2, the stop period Tstp, which is an integration of periods of engine stop with power supply to the control part 13, is reset at time t6. The electronic control unit 10 thus completes the processing described above.

An operation and advantage of the electronic control unit 10 according to the first embodiment will be described next.

According to the electronic control unit 10 described above, the actuator 20A, which is related to the diagnosis object, is forcibly driven and diagnosed even if the vehicle is used primarily for short distance travel without operating the internal combustion engine 20. Thus the diagnosis can be performed frequently.

Since the stop period Tstp is counted in a period from when the power supply to the control part 13 is tuned on to when it is turned off in a period from when the internal combustion engine 20 is stopped last to when it is started next time, the count is not increased in the state that the vehicle completely stopped its functions. That is, the stop period is counted accurately only in the period, during which the internal combustion engine 20 is not operated, among the states, in which the vehicle is in operation, that is, when the internal combustion engine 20 is not operated for vehicle travel although the electronic control unit 10 is in operation with power supply from the battery +B.

In addition, since the count of the stop period Tstp is integrated over plural driving cycles until it reaches the threshold value Tth, the stop period is not reset even when the short travel is repeated plural times. As a result, the period of stopping of the internal combustion engine 20 can be accurately determined.

(First Modification)

Figure 4:
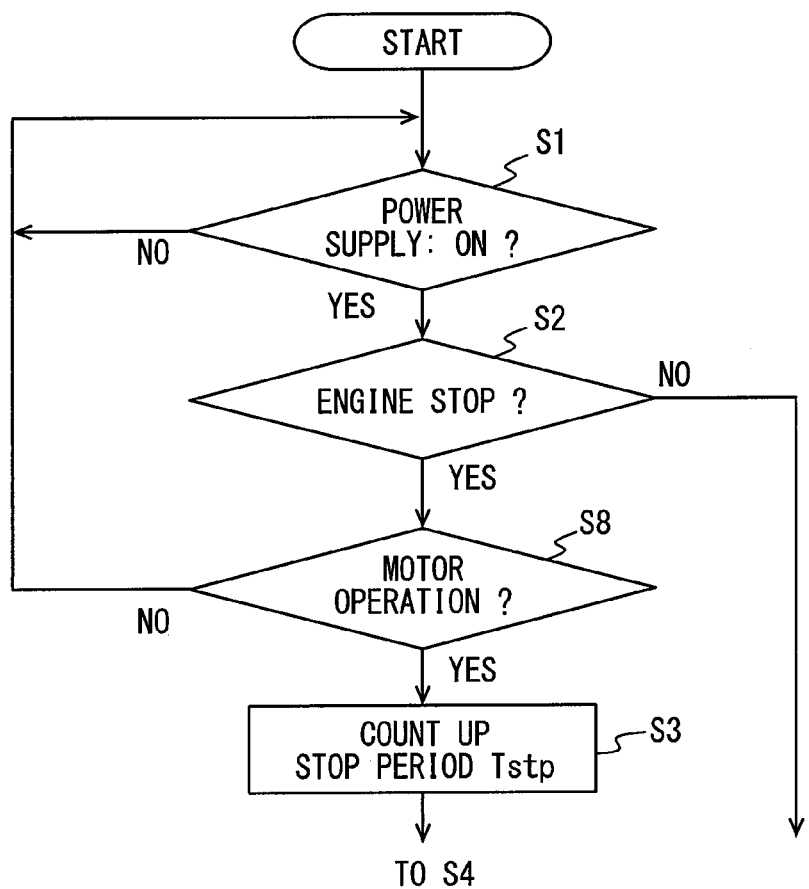
FIG. 4 is a flowchart showing an operation of an electronic control unit according to a first variation of the first embodiment.

As a condition for counting up the stop period Tstp of the internal combustion engine 20 at step S3, it is possible to add checking whether the motor 30 is in operation. For example, as shown in FIG. 4, step S8 may be executed before step S3 is executed following the determination of YES at step S2. In FIG. 4, step S4 and subsequent steps are not shown because these steps are same as in the first embodiment.

At step S8, the control part 13 checks whether the motor 30 is being operated. When an actuator forming the motor 30 is in operation whether the vehicle is moving or not, YES is outputted at step S8 and step S3 is executed. When the actuator forming the motor 30 is not in operation, NO is outputted at step S8 and step S1 is executed.

According to the first modification, the stop period Tstp of the actuator 20A of the internal combustion engine 20 can be counted under the generally same condition as counting of the driving period of the actuator of the motor 30, which is provided as a set with the internal combustion engine 20. That is, in many cases that the motor 30 does not operate to generate the driving power or to generate electric power as the generator upon vehicle deceleration, the vehicle is at rest, and hence the internal combustion engine 20 also need not be driven for vehicle travel. For this reason, it is possible to exclude the stop period of the internal combustion engine 20, which is in such a situation, from being counted. Thus, the stop period Tstp of the internal combustion engine 20 can be calculated more accurately by excluding the period, in which the motor 30 is not being driven in spite of power supply to the control part 13 and non-operation of the internal combustion engine 20, for example, the vehicle is at rest at a traffic light.

In this example, the stop period Tstp is counted up on condition that the power is supplied to the control part 13 and the motor 30 is driven. That is, step S3 is executed only when both of step S2 and step S8 output YES. However, step S3 may be executed when at least one of step S2 and step S8 outputs YES.

(Second Modification)

Figure 5:
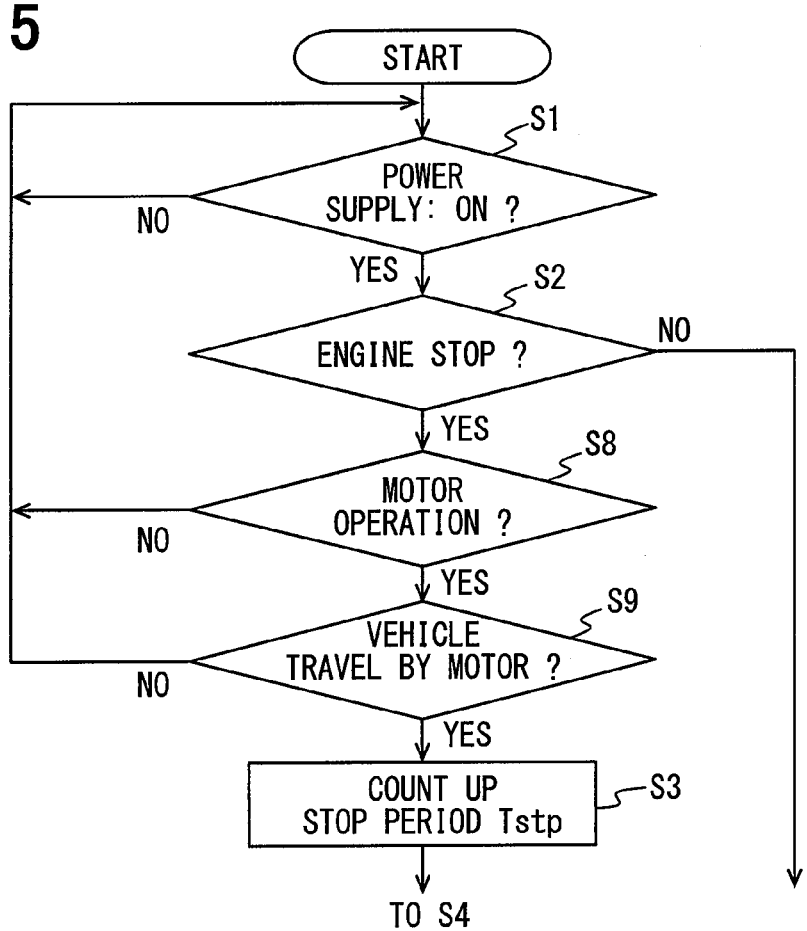
FIG. 5 is a flowchart showing an operation of an electronic control unit according to a second variation of the first embodiment.

Further, as a condition for counting up the stop period Tstp of the internal combustion engine 20, it may be additionally checked whether the motor 30 is being driven for vehicle travel. For example, step S9 may be executed additionally before executing step S3 after step S2 outputs YES and step S8 outputs YES. In FIG. 5, step S4 and subsequent steps are not shown because these are same as in the first embodiment.

At step S9, the control part 13 checks whether the vehicle is traveling using driving power of the motor 30. When it is determined to be YES indicating that the vehicle is traveling with the motor 30 being in operation as a driving power source, step S3 is executed. When it is determined to be NO indicating that the vehicle is not traveling, step S1 is executed again.

In the second modification, the stop period Tstp of the internal combustion engine 20 is counted in a state that the actuator is loaded more than in the first modification, that is, the vehicle is being driven to travel by the motor 30 although it should be driven for travel by the internal combustion engine 20, for example. That is, since the stop period Tstp is not counted when the actuator is loaded less, the internal combustion engine 20 is protected from operated forcibly unnecessarily.

In this example, the stop period Tstp is counted up on condition that the power is supplied to the control part 13, the motor 30 is driven and the vehicle travels with the driving power of the motor 30. That is, step S3 is executed only when all of step S2, step S8 and step S9 output YES. However, step S3 may be executed when at least one of step S2, step S8 and S9 outputs YES.

Second Embodiment

In the first embodiment, the first modification and the second modification, the stop period Tstp of the internal combustion engine 20 is counted up exemplarily on condition that, in addition to that the internal combustion engine 20 is not operated, the power is supplied to the control part 13, the motor 30 is driven and the vehicle travel with the driving power of the motor 30. In a second embodiment however the count part 11 counts the stop period Tstp by acquiring time information from time monitoring part, which has time information or clock function.

Figure 6:
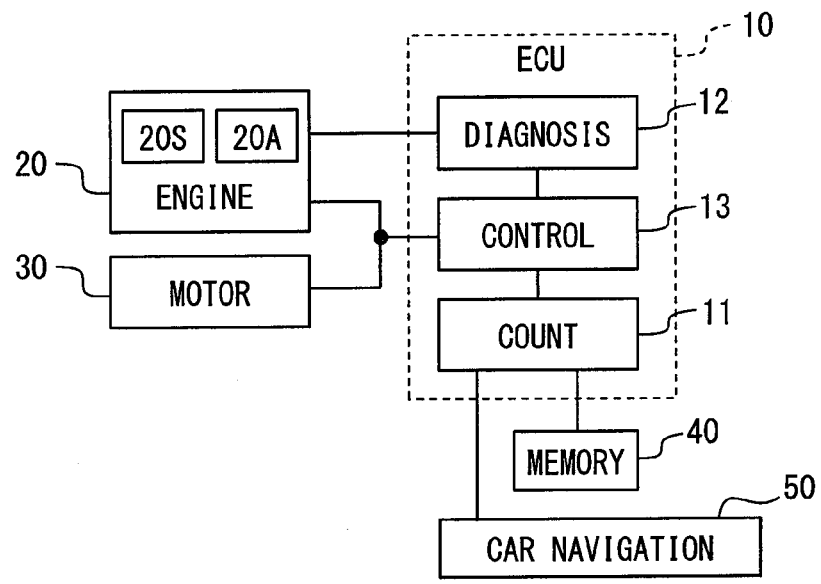
FIG. 6 is a block diagram showing an electronic control unit and its peripheral devices according to a second embodiment.

As shown in FIG. 6, the count part 11 is connected to a car navigation 50, which is the time monitoring part. The count part 11 stores in the memory 40 last stop time, at which the internal combustion engine 20 stopped last time. The count part 11 is configured to provide the control part 13 with the stop period, which is calculated as a difference between the present time and the last stop time of the internal combustion engine 20. The time monitoring part is not limited to the car navigation 50 and may be any other time counting devices such as a built-in clock of a vehicle.

Figure 7:
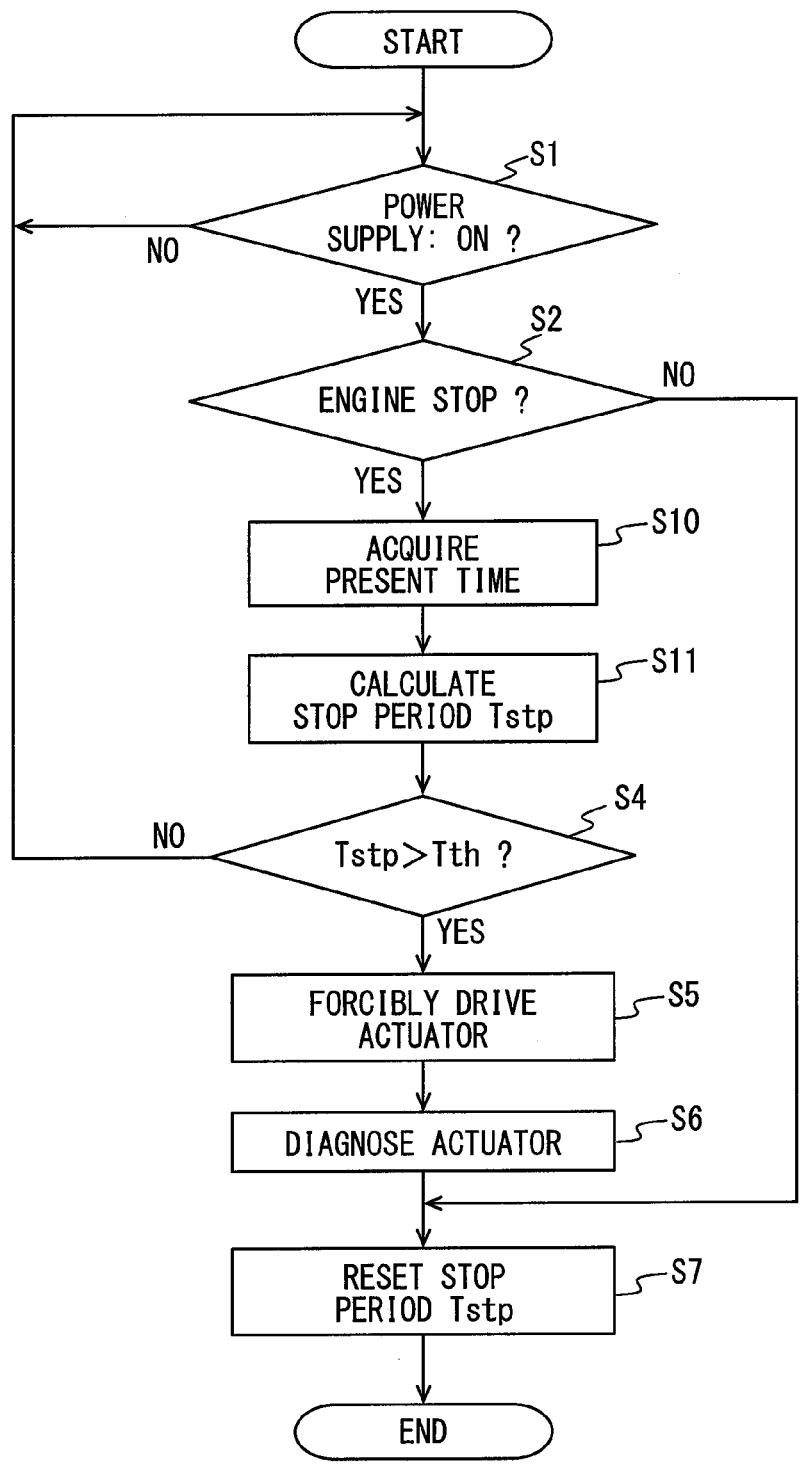
FIG. 7 is a flowchart showing an operation of the electronic control unit according to the second embodiment.

The operation of the electronic control unit 10 according to the second embodiment will be described in detail with reference to FIG. 7.

In the second embodiment, step S10 and step S11 are provided in place of step S3 of the processing in the first embodiment. For this reason, step S1, step S4 to step S7 are not described in detail.

At step S10, the count part 11 acquires the present time tp from the car navigation 50, which has time information therein.

The count part 11 then calculates at step S11 a time difference, as the stop period Tstp, between the present time tp and the last stop time tl of the internal combustion engine 20 stored in the memory 40. The count part 11 outputs the calculated stop period Tstp to the control part 13.

Step S4 and subsequent steps S5 to S7 are same as those in the first embodiment. It is noted that resetting of the stop period Tstp at S7 means updating the last stop time tl of the internal combustion engine 20 stored in the memory 40 to the time, at which the actuator 20A is forcibly driven at step S5 for diagnosis.

The electronic control unit 10 according to the second embodiment calculates the stop period Tstp of the internal combustion engine 20 by storing the time tl of last stop of the internal combustion engine 20 in the memory 40, acquiring the present time tp and calculating the difference tp−tl between the last stop time tl and the present time tp. Since the time monitoring part having time information is generally available in the vehicle, the stop period Tstp can be easily calculated by way of simple processing in comparison to the counting method used in the first embodiment. That is, the control part 13 is loaded less for calculating the stop period Tstp.

The time monitoring part continues to measure time even when the control part 13 is not powered. As a result, the actual period, in which the internal combustion engine 20 is not operated, can be acquired and calculated accurately.

Other Embodiment

The electronic control unit described above with reference to preferred embodiments is not limited to such embodiments but may be implemented in differently modified embodiments.

In all of the embodiments and modifications described above, the stop period Tstp of the internal combustion engine 20 is counted on condition that the electronic power unit 10 is electrically powered. However, as far as the electronic control unit 10 is capable of continuing to count the stop period Tstp even when the power supply to the electronic control unit 10 is turned on, the stop period Tstp of the internal combustion engine 20 may be counted continuously whether the electronic control unit 10 is powered or not.

In the first embodiment, the first modification and the second modification, the stop period Tstp of the internal combustion engine 20 is counted by integration of time over the driving cycles. However, the count part 11 may be configured to calculate the stop period Tstp anew at each driving cycle.

In this modification, the count part 11 resets and calculates the stop period at every driving cycle. That is, the stop period is reset at each turn-off of the power supply to the control part 13 and counted up under the same condition as that in the first embodiment, the first modification and the second modification. This modification is performed by providing a step for resetting a stop period before step S1 in the processing of the first embodiment, the first modification and the second modification.

According to this modification, since the stop period is reset each time the power supply to the control part 13 is turned off, no memory is needed. The electronic control unit 10 can be reduced in costs and a space for mounting peripheral devices can be saved.

The driving cycle is not limited to the period, which is from when the power supply to the control part 13 is turned on to when it is turned off. For example, the driving cycle may be defined to a cycle, which is from when a vehicle key (for example, ignition switch IG-SW) is turned on by a user to when it is turned off.

In each embodiment and modification described above, the diagnosis object is forcibly driven and the diagnosis object is diagnosed when the stop period Tstp of the internal combustion engine 20 reached the predetermined threshold value Tth. However, this timing is not limited to the disclosed timing.

It is preferred that the diagnosis object is driven forcibly and diagnosed within a period from when the power supply to the control part 13 is turned on to when the vehicle starts to travel. According to this preferred diagnosis operation, drivability is not lowered in comparison to a case, in which the diagnosis operation is performed while the vehicle is traveling.

The diagnosis object is driven forcibly and diagnosed at time when, after the stop period Tstp reached the predetermined threshold value Tth, the ignition switch is turned on for the first next time and the power supply to the control part 13 is turned on. Since the diagnosis operation is performed while the vehicle is at rest, the drivability is not lowered.

What is claimed is:

1. An electronic control unit for controlling driving of a vehicle, which has an internal combustion engine and a motor as a vehicle driving power source, the electronic control unit comprising:

count circuitry configured to count an amount of time of a stop period in which the internal combustion engine is stopped, the stop period including an amount of time between a last stop time of the internal combustion engine and a present time;

diagnosis circuitry connected to a diagnosis object that is an engine part contained within the internal combustion engine, the diagnosis circuitry being configured to perform a diagnosis concerning normal operation of the diagnosis object, and the diagnosis object being operative when the internal combustion engine is in an operative state and being inoperative when the internal combustion engine is stopped; and control circuitry configured to control operation of the internal combustion engine in the operative state by using the diagnosis object, wherein the control circuitry is configured to drive the diagnosis object forcibly from an inoperative state to the operative state and to command the diagnosis circuitry to perform the diagnosis concerning normal operation of the diagnosis object, when the stop period reaches a predetermined threshold value.

2. The electronic control unit according to claim 1, wherein:

the count circuitry is configured to count the stop period from when a power supply to the control circuitry is turned on to when the power supply to the control circuitry is turned off in a period, which is from when the internal combustion engine is stopped last time to when the internal combustion engine is started next time.

3. The electronic control unit according to claim 1, wherein:

the count circuitry is configured to count the stop period while the motor is driven in a period, which is from when the internal combustion engine is stopped last time to when the internal combustion engine is started next time.

4. The electronic control unit according to claim 1, wherein:

the count circuitry is configured to count the stop period while the vehicle travels using the motor as a driving power source in a period, which is from when the internal combustion engine is stopped last time to when the internal combustion engine is started next time.

5. The electronic control unit according to claim 1, further comprising:

a time monitoring circuitry having time information, wherein the difference between the last stop time and the present time are acquired from the time monitoring circuitry, the last stop time indicating time when the internal combustion engine is stopped last time.

6. The electronic control unit according to claim 1, wherein:

the count circuitry is configured to count the stop period by integration over plural driving cycles of the vehicle until the stop period reaches the predetermined threshold value.

7. The electronic control unit according to claim 1, wherein:

the count circuitry is configured to count the stop period newly at every driving cycle of the vehicle.

8. The electronic control unit according to claim 1, wherein:

the control circuitry is configured to forcibly drive the diagnosis object and diagnoses the diagnosis object within a period from when the power supply to the control circuitry is turned on to when the vehicle starts to travel.

9. The electronic control unit according to claim 1, wherein:

the count circuitry is configured to continue to count the stop period from when the internal combustion engine is stopped last time to when the internal combustion engine is started again, the stop period including all engine stop periods whether a power supply to the control circuitry is in an on-state and off-state.

10. An electronic control unit for controlling driving of a vehicle, which has an internal combustion engine and a motor as a vehicle driving power source, the electronic control unit comprising:

time monitoring circuitry configured to acquire a last stop time and a present time to acquire a stop period in which the internal combustion engine is stopped, the time monitoring circuitry including a configuration acquiring the stop period as a difference between the last stop time and the present time, the last stop time indicating time when the internal combustion engine was stopped last time;

diagnosis circuitry connected to a diagnosis object that is an engine part contained within the internal combustion engine, the diagnosis circuitry being configured to perform a diagnosis concerning normal operation of the diagnosis object, and the diagnosis object being operative when the internal combustion engine is in an operative state and being inoperative when the internal combustion engine is stopped, the engine part including at least one of an actuator and a sensor, the actuator including a fuel injection device, the sensor including an airflow sensor; and control circuitry configured to control operation of the internal combustion engine in the operative state by using the diagnosis object, wherein the control circuitry is configured to drive the diagnosis object forcibly from an inoperative state to the operative state and to command the diagnosis circuitry to perform the diagnosis concerning normal operation of the diagnosis object, when the stop period reaches a predetermined threshold value.

11. An electronic control unit for controlling driving of a vehicle, which has an internal combustion engine and a motor as a vehicle driving power source, the electronic control unit comprising:

time monitoring circuitry configured to acquire a last stop time and a present time to acquire a stop period in which the internal combustion engine is stopped, the time monitoring circuitry including a configuration acquiring the stop period as a difference between the last stop time and the present time at every driving cycle of the vehicle, the last stop time indicating time when the internal combustion engine was stopped last time;

diagnosis circuitry connected to a diagnosis object that is an engine part contained within the internal combustion engine, the diagnosis circuitry being configured to perform a diagnosis concerning normal operation of the diagnosis object, and the diagnosis object being operative when the internal combustion engine is in an operative state and being inoperative when the internal combustion engine is stopped;

control circuitry configured to control operation of the internal combustion engine in the operative state by using the diagnosis object; and reset circuitry configured to reset the stop period at every driving cycle of the vehicle, wherein the control circuitry is configured to drive the diagnosis object forcibly from an inoperative state to the operative state and to command the diagnosis circuitry to perform the diagnosis concerning normal operation of the diagnosis object, when the stop period reaches a predetermined threshold value.

* * * * *